Oct. 17, 1967  C. H. ROGERS ET AL  3,347,345
BRAKE LINING AND COOLING MEANS
Filed March 1, 1966
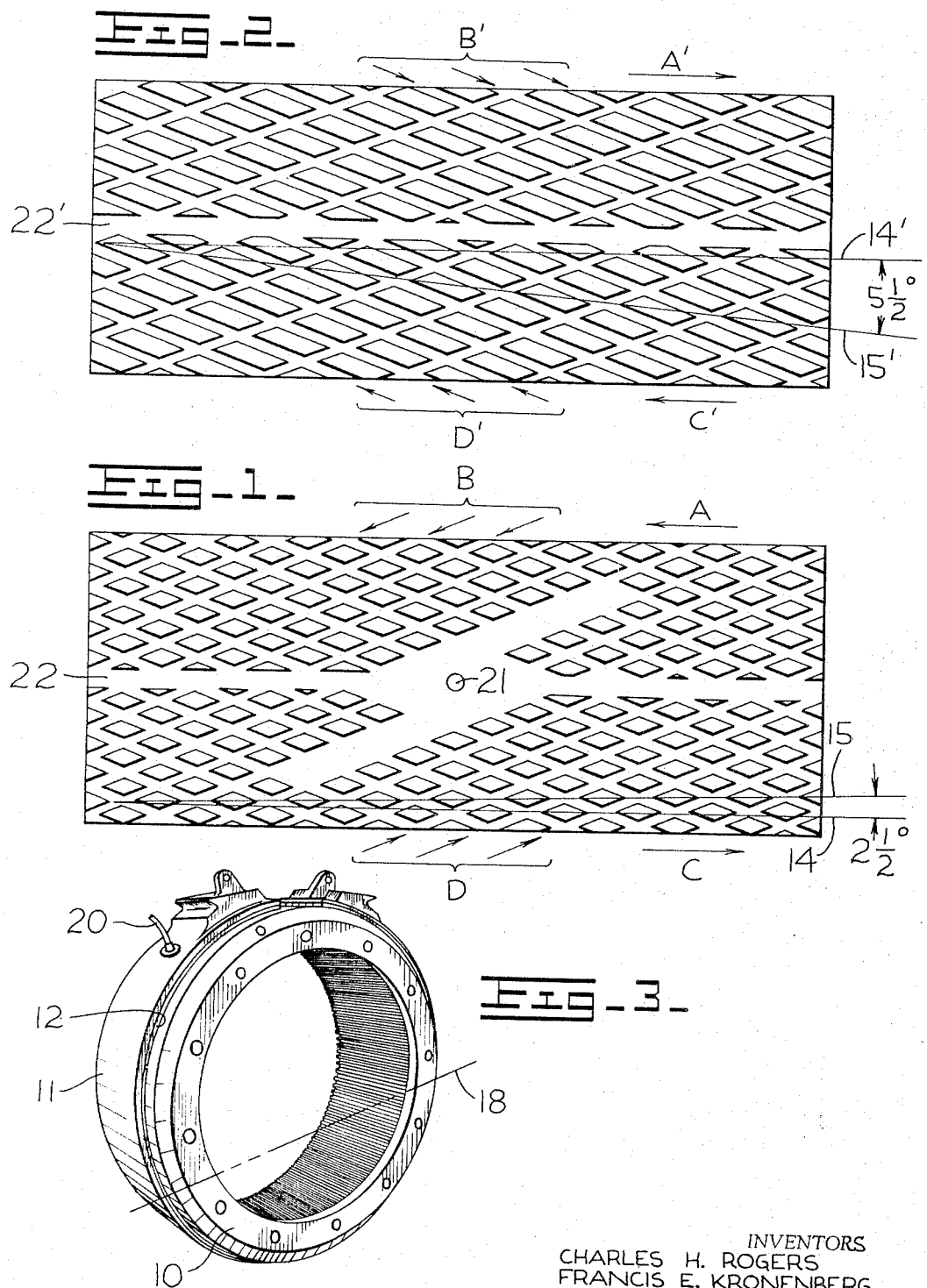
INVENTORS
CHARLES H. ROGERS
FRANCIS E. KRONENBERG
ALEXIUS B. OLSON
THEODORE J. HEBNER
ATTORNEYS

United States Patent Office 3,347,345
Patented Oct. 17, 1967

3,347,345
BRAKE LINING AND COOLING MEANS
Charles H. Rogers, East Peoria, Francis E. Kronenberg and Alexius B. Olson, Peoria, and Theodore J. Hebner, Pekin, Ill., assignors to Caterpillar Tractor Co., Peoria, Ill., a corporation of California
Filed Mar. 1, 1966, Ser. No. 530,987
1 Claim. (Cl. 188—264)

ABSTRACT OF THE DISCLOSURE

Protection of brake linings and drums by means for directing coolant to the surfaces which are subject to deterioration from wear as a result of friction and heat with particular reference to the arrangement of grooves and lands on a brake lining to induce good circulation of coolant and to inhibit tracking of lands on the brake drum.

---

Drum type brakes for large vehicles are known, in which the friction components are partially or fully immersed in a liquid coolant, such as oil, and the linings are grooved to admit coolant to the surface of the drum. Such linings are generally formed in uniform patterns of grooves and lands, creating a series of bands across the brake drum where the lands flow or align with each other in the direction of relative movement between the bands and the drum, thus creating areas of relatively high friction, heat and wear.

Generally speaking, it is desirable to supply as much coolant to the brake housings as possible. To pump large quantities of coolant at a high rate of flow, while seemingly desirable, is considered uneconomical because of power requirements, cost, and space limitation on many vehicles.

It is the object of the present invention to improve cooling systems of drum type brakes by employing means for circulating a limited quantity of cooling fluid to the housing and by providing an improved lining groove pattern which causes an induced flow of fluid through the lining grooves and into contact with the drums and also greatly reduces tracking of land areas of the pattern, which tends to create high heat and wear bands on the drum. Further, and more specific objects and advantages of the invention are made apparent in the following specification, wherein reference is made to the accompanying drawings:

In the drawings:
FIG. 1 is a developed view of a lining illustrating a groove pattern arranged thereon in accordance with the present invention;
FIG. 2 is a view like FIG. 1 illustrating a modified form of the invention; and
FIG. 3 is a perspective of a typical brake drum and brake band combination with which the present invention is employed.

FIG. 3 shows a typical brake assembly which comprises a brake drum 10 surrounded by a band 11, the band having a lining shown at 12 usually formed of arcuate segments of molded asbestos type material. Such lining segments are shown in FIGS. 1 and 2 where they are developed to a flat plane to clearly illustrate the configuration of the grooving thereon. Referring to FIG. 1, parallel sets of intersecting diagonal grooves are shown as forming a pattern of spaced diamond shaped lands. Similar designs have been employed on brake linings and heretofore the angles of the grooves with respect to the lining have been the same, so that the diamond shaped lands form aligned rows extending longitudinally of the lining and parallel to its edges. In accordance with the present invention the angles of the parallel grooves crossing the linings in one direction are slightly different than in the other direction with the result that the longitudinal rows of diamond-shaped lands are not parallel to the edges of the lining. Instead they follow slightly diverging patterns as indicated by the longitudinal lines shown where line 14, parallel to the edge of the brake lining, and a line 15, following center lines of a row of lands, diverge approximately 2½ degrees through the length of the lining segment. One advantage of this arrangement resides in the fact that the revolving brake drum, which moves in a direction parallel to the edges of the lining segment, is not subjected to alternate bands having large and small areas in contact with lands of the lining. This reduces grooving in alternate longitudinal areas of the brake drum surface and reduces temperature which tends to deteriorate the land areas of the lining.

The lubrication of disc type drums and clutches with a coolant has become common practice, however, such cooling means have not been employed with drum type brakes and the present invention provides lubrication in a manner that is practical and economical. Referring again to FIG. 3 a broken line 18 indicates oil level in a housing, not shown, which encloses the brake. Oil is introduced to the space between the brake band and brake drum or into the spaces provided by the grooves in the lining from any suitable source through the conduit shown at 20 in FIG. 3 and an opening 21 in the brake band and lining as indicated in FIG. 1. It has proven desirable in some applications to remove some of the lands providing a reservoir in the vicinity of the opening 21 and to provide connection for free flow of oil between line segments by large grooves, such as shown at 22 extending lengthwise centrally of the segments.

While an oil level is maintained only at the lower portion of the brake as indicated by the line 18 in FIG. 3, the arrangement of grooves taught by the present invention tends to provide a flow of coolant through most—if not all—of the full circumference of the brake drum. As the brake drum rotates, for example, in the direction of the arrow shown at A in FIG. 1, it tends to force or pump oil into the open ends of grooves extending generally in the same direction as the arrow A, such as those grooves indicated by the small arrows B through the whole length of the segment. Thus oil, particularly on the lower segments which are immersed and partially immersed in the oil, is brought into immediate contact with the surface of the drum throughout its width, and the residual effect of such circulation is to cause oil to be carried with the drum throughout the entire circumference of the brake assembly. Since brakes are applied in both directions of travel, the drum may sometimes be moving in the direction of the arrow C at the lower side of FIG. 1, in which a quantity of oil tends to flow or to be pumped into the grooves on that side represented by the arrows D. Of course, the relative movement between the drum and brake band occurs at opposite edges of the lining segments for movement in either direction, but the tendency to flow from one side is greater than the tendency to flow from the opposite side depending upon the direction of rotation of the drum. This increased tendency to flow results from the angularity of the channels and particularly from the fact that there are more openings at the end of the channels which are inclined in the direction of the arrows B and D, than there are openings in the oppositely inclined channels. Consequently, there is a differential in the tendency to flow because of the angularity of the grooves with respect to the configuration of the lining segment, which results in the flow in one direction for each direction of movement of the drum.

A preferred embodiment of the invention which creates an increased flow differential through the grooves of the lining is shown in FIG. 2, wherein the grooves in one parallel group are more numerous than in the other and the lands have been made of an elongated trapezoidal shape, as distinguished from the diamond shaped lands shown in FIG. 1. In the pattern shown, a line 15′ following a row of lands diverges approximately 5½ degrees from a line 14′ parallel to the edges of the lining. Because of this arrangement, approximately twice as many grooves extend to the edge of the pattern at the angle than at the opposite angle. Consequently, upon movement of the brake drum in the direction of the arrow A′ oil is directed through the closely spaced grooves B′ while, as is clearly shown in this view, at the opposite edge of the lining, oil flowing in the same direction would have the effect of being pumped through only approximately one-half as many grooves. This is also true when the direction of the drum is that shown at C′ and D′ represents the direction of grooves which receive oil.

The segment shown in FIG. 2 has the centrally disposed channel 22′ corresponding to the channel 22 in FIG. 1 and one of the sections will be provided with an opening corresponding to opening 21 in FIG. 1 and also, if desired, with the reservoir surrounding said opening. It is possible under some circumstances that a continuous supply of oil will not be directed to the upper portion of the band as by a conduit 20, but the oil in the housing and rotation of the brake drum will be relied upon entirely for circulating oil through the grooves. In this event the opening 21 would not be present and the very much greater differential in flow from opposite sides of the lining provided by the modification shown in FIG. 2 would insure ample circulation for adequate cooling.

Lining segments of the type shown are generally fastened to the brake band by rivets, but since such rivets are entirely conventional, they are not disclosed in the drawings, nor are the holes provided for their reception shown in the segments of FIGS. 1 and 2.

We claim:

In a drum type brake including a drum, a brake band encircling the drum, and means to provide a body of liquid coolant for immersing at least a portion of the brake, a lining in the brake band, said lining having grooves arranged in parallel groups which intersect each other at an angle to provide parallel rows of spaced lands extending generally longitudinally of the lining, the rows of lands being at a slight angle to the direction of travel of the surface of the brake drum to avoid the effect of tracking in the contact between the drum and the lands, means including an orifice extending through the band and lining to introduce coolant to the area between the lining and drum, and areas on the lining void of said lands adjacent said orifice and extending longitudinally of the band to provide a reservoir and circumferential path for distribution of the coolant.

References Cited

UNITED STATES PATENTS

| 1,193,366 | 8/1916 | Demara | 188—264 X |
| 1,245,040 | 10/1917 | Scaife | 188—264 |
| 1,464,142 | 8/1923 | Smith | 188—264 X |
| 2,851,132 | 9/1958 | James | 188—264 |

FOREIGN PATENTS

| 537,069 | 10/1931 | Germany. |

MILTON BUCHLER, *Primary Examiner.*

G. E. A. HALVOSA, *Assistant Examiner.*